United States Patent [19]

Scheitlin

[11] 4,431,609
[45] Feb. 14, 1984

[54] REMOVAL OF RADIUM FROM ACIDIC SOLUTIONS CONTAINING SAME BY ADSORPTION ON COAL FLY ASH

[75] Inventor: Frank M. Scheitlin, Oak Ridge, Tenn.

[73] Assignee: The United States of America as represented by the United States Department of Energy, Washington, D.C.

[21] Appl. No.: 461,301

[22] Filed: Jan. 27, 1983

[51] Int. Cl.$^3$ .................... C01F 13/00; G21F 9/12
[52] U.S. Cl. ........................................ 423/2; 423/6; 423/20; 252/631; 252/633; 252/628; 252/629; 210/682
[58] Field of Search ................. 423/2, 6, 20; 252/631, 252/628, 629, 633; 210/681, 682

[56] References Cited

U.S. PATENT DOCUMENTS 3,563,890  2/1971  Perl et al. ..................... 252/631 X

OTHER PUBLICATIONS

Morris, J. S. and G. Bobrowski, "The Determination of Radium-226, Lead-214, and Bismuth-214 in Fly Ash Samples from Eighteen (18) Coal Fired Power Plants in the United States", Fifth Int. Ash Util. Symp., 1979, pp. 460-470.
Liskowitz et al., "Leachate-Treatment Technique Utilizing Fly Ash as Low-Cost Sorbent, Quarterly Progress Report", Report DOE/PC/30321-3, Feb. 1982, New Jersey Institute of Technology.
Chemical Abstracts, vol. 67, 1967, p. 6362, #67472g, Ortova et al., "Efficiency of Drinking Water Decontamination from Radioactive Substances with Certain Natural Sorbents."
Chemical Abstracts, vol. 70, 1969, p. 241, #80711r, Otto et al., "Use of Kieselguhr, Multicyclone Powders, and Several Other Adsorbents for Decontamination of Waste Containing Cesium-137 and Strontium-90/Yttrium-90."
Chemical Abstracts, vol. 78, 1973, p. 221, #151263z, Otto et al., "Usability of Some Adsorbents for the Decontamination of Radioactive Waste."

Primary Examiner—Brooks H. Hunt
Assistant Examiner—Matthew A. Thexton
Attorney, Agent, or Firm—Fred O. Lewis; Stephen D. Hamel; Richard G. Besha

[57] ABSTRACT

The invention is a process for the removal of radium from acidic aqueous solutions. In one aspect, the invention is a process for removing radium from an inorganic-acid solution. The process comprises contacting the solution with coal fly ash to effect adsorption of the radium on the ash. The radium-containing ash then is separated from the solution. The process is simple, comparatively inexpensive, and efficient. High radium-distribution coefficients are obtained even at room temperature. Coal fly ash is an inexpensive, acid-resistant, high-surface-area material which is available in large quantities throughout the United States. The invention is applicable, for example, to the recovery of $^{226}$Ra from nitric acid solutions which have been used to leach radium from uranium-mill tailings.

16 Claims, 1 Drawing Figure

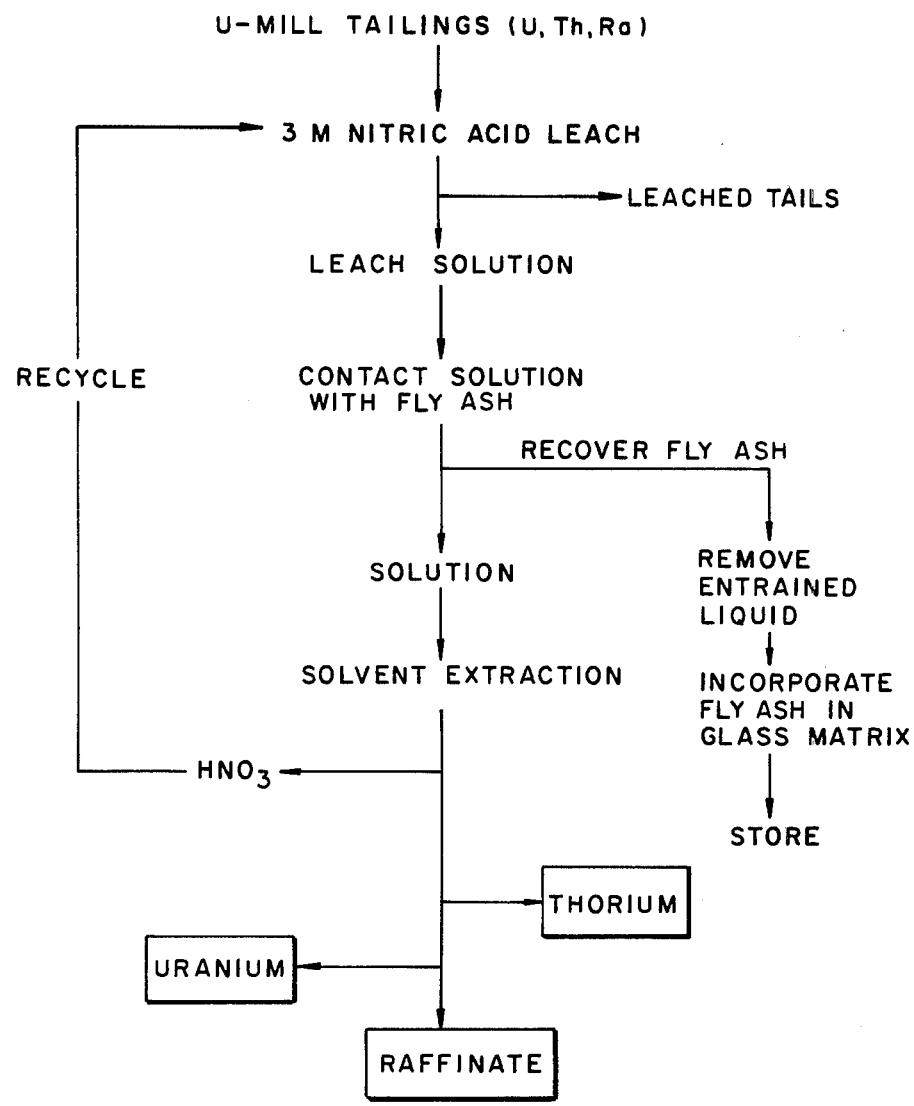

REMOVAL OF RADIUM FROM ACIDIC SOLUTIONS CONTAINING SAME BY ADSORPTION ON COAL FLY ASH

The invention was made as a result of a contract with the U.S. Department of Energy.

BACKGROUND OF THE INVENTION

This invention relates broadly to processes for the removal of radium from acidic solutions and more particularly to processes for effecting such removal by contacting the radium-containing solution with a particulate material.

Uranium usually is extracted from ore by leaching with either sulfuric acid or sodium carbonate. The leaching operation recovers more than 90% of the uranium without dissolving significant quantities of the various radionuclides present in the ore. The resulting leached uranium-ore residues (tailings) constitute a potential radiological hazard requiring perpetual surveillance, the major radiation hazards being due to dissolved radium-226 and its daughter, radon-222.

In the United States, millions of tons of such tailing have accumulated at mill sites. It has been proposed that the tailings may be made environmentally acceptable by leaching them with nitric acid solution to remove the radium-226. Preliminary experiments conducted with 3 M $HNO_3$ solution indicate that this method is promising, though relatively expensive. The present invention was made in the course of supplementary experiments directed toward finding a suitable process for removing radium-226 from the nitric acid leachate resulting from treatment of the tailings. It was hoped that a process could be found which would be both inexpensive and capable of removing the radium-226 to an extent permitting re-use of the nitric acid in the treatment of uranium-mill tailings.

The known previous art relating to the recovery of radium from uranium-mill waste solutions includes the following article: W. D. Arnold and D. J. Crouse, *I & E Process Design and Development*, 4(3), 333–337, July 1965. That article describes the adsorption of radium from simulated lime-neutralized acidic waste solutions by adsorption on various inorganic ion exchangers, including natural and synthetic zeolites, barytes, and certain zirconium and barium salts. A few tests were conducted with unneutralized acidic solutions but poor results were obtained. The following reports describe the use of nitric acid solutions for the removal of radium from uranium ore or tailings: 1. ORNL/TM-7065 (January 1980), "Removal of Hazardous Radionuclides from Uranium Ore and/or Mill Tailings", Oak Ridge National Laboratory, Oak Ridge, Tenn. 37830. 2. ORNL/TM-5944 (August 1977), "Nitric Acid Leaching of Radium and Other Significant Radionuclides from Uranium Ores and Tailings", Oak Ridge National Laboratory.

The following report discusses the influence of various burning conditions on the composition and the leaching and sorbate characteristics of coal fly ash: Report DOE/PC/30231--3/(1982), "Leachate-Treatment Technique Utilizing Fly Ash as a Low-Cost Sorbent, Quaterly Progress Report", New Jersey Institute of Technology, Newark, N.J. 07102. The report describes the use of fly ash for the treatment of certain cations and anions originally leached from fly ash in fly ash ponds or in landfill sites. The report does not discuss radium. The use of ash of brown coal (presumably bed ash) to remove $^{137}Cs$ and $^{90}Sr/^{90}Y$ from water is disclosed in the following abstract: SZS-9/68, pp. 14–25, "Use of Kieselguhr, Multiclone Powders and Several Other Adsorbants for Decontamination of Waste Containing $^{137}Cs$ and $^{90}Sr$". (Staatliche Zentrale fuer Strahlenschultz, Berlin, East Germany).

SUMMARY OF THE INVENTION

It is an object of this invention to provide a novel process for the removal of radium from acidic solutions containing the same.

It is another object to provide a process for the removal of radium isotopes from mineral-acid solutions.

It is another object to provide a novel method for the disposal of radium dissolved in aqueous nitric acid.

In one aspect, the invention is a process for recovering radium from an acidic solution containing the same. The solution is contacted with coal fly ash for a time sufficient to effect adsorption of the radium on the ash. The resulting radium-carrying ash then is separated from the solution. In another aspect, the invention is a process for the recovery of radium dissolved in acidic aqueous solution. The solution is contacted with coal fly ash to effect adsorption of the radium on the ash, following which the radium-carrying ash is separated from the solution. The separated ash is incorporated in a refractory matrix material, and the resulting ash-containing material is stored. In another aspect, the invention is a process for the recovery of radium from an inorganic-acid solution containing radium, uranium, and thorium. The solution is contacted with coal fly ash to effect adsorption of the radium on the ash. The resulting mixture is separated into a radium-carrying ash fraction and a liquid fraction containing uranium and thorium. Preferably, the contacting operation is effected at room temperature.

BRIEF DESCRIPTION OF THE FIGURE

The single FIGURE is a flow sheet showing the invention as utilized in a process for the removal of certain radioactive constituents from a nitric acid solution used to extract radium from uranium-mill tailings.

DETAILED DESCRIPTION OF THE INVENTION

The invention is applicable generally to the recovery of radium from aqueous acidic solutions. For brevity, however, it will be illustrated as used to recover radium from the leachate resulting from nitric acid treatment of uranium-mill tailings. I have found that coal fly ash is a highly suitable agent for the physical adsorption of radium from the nitric-acid leachate. In separate tests, samples of the leachate were contacted at ambient temperature with natural (as-recovered) fly ash derived from coal mined in different geographic regions of the United States. Each ash-and-leachate mixture was agitated for a selected time, following which the ash was permitted to settle out. The radium-distribution coefficient was determined by a conventional technique comprising scintillation-spectrometer measurement of the gamma emission from a daughter of $^{226}Ra$. (See above-cited ORNL/TM-7065 for details.) In each test, the consumption of nitric acid was relatively low, high radium-distribution coefficients were obtained, and the radium content of the leachate could be decreased to environmentally acceptable values by a few stages of the treatment.

The following examples describe the adsorption tests more detail.

EXAMPLE I

Adsorption of Radium With Fly Ash Derived From Tennessee Coal

This experiment was conducted with fly ash recovered from collectors installed in a large electrical power lant situated in Kingston, Tennessee. The ash was analyzed for the following constituents, whose concentrations are expressed in weight percent: Al, 15%; Ca, 1%; Fe, 8%; Si, 23.1%; Ba, 0.01%. A 10.65-g sample f the ash was mixed with 100 ml of 1 M $HNO_3$ uranim-tailings solution (leachate) containing 102 pCi of $^{226}Ra$/ml. The resulting mixture was agitated for two ours and then allowed to stand overnight. A 30 ml imple of the resulting supernate was analyzed for $^{226}Ra$ content by the technique referred to above. The lution contained 3.53 pCi/ml of $^{226}Ra$. The corresponding distribution coefficient for the $^{226}Ra$ was calulated to be about 1500. (The radium-distribution coefcient is defined as the amount of radium in a gram of olid divided by the amount of radium in ml in the ystem at equilibrium).

In a related experiment, 1.8050 g of the same fly ash nd 25 ml of the same solution were stirred for ten inutes and then titrated with 1 N NaOH. This procedure showed the nitric acid consumption by the fly ash  be 1%.

In a second adsorption experiment conducted with e Kingston fly ash, sufficient ash was added to 3 M $HNO_3$ uranium-tailings leachate (226 pCi of $^{226}Ra$/ml)  form a 2% solids mixture. The mixture was stirred or two hours and then allowed to come to equilibrium. 30 ml sample of the aqueous solution was withdrawn, ltered, and analyzed as described. The $^{226}Ra$ distribuon coefficient was 276.

EXAMPLE II

Adsorption of Radium With Fly Ash Derived From Colorado Coal

Fly ash derived from collectors installed in a power lant burning Colorado coal was analyzed for selected omponents; these were present in the following percentages by weight: Al, 10.1%; Ca, 17.5%; Fe, 3.6%; Si, 0.8%; $SO_4$, 0.27%. About 85% of this ash was finer han 44 mm (325 mesh). The ash was more free-flowing han that used in Example I.

A 100 ml sample of 3 M $HNO_3$ uranium-tailings eachate containing 226 pCi $^{226}Ra$/ml was added to a .02-g sample of the fly ash. The resulting mixture (2% olids) was agitated for two hours at room temperature nd allowed to stand overnight. The supernatent $HNO_3$ olution contained 2.8 pCi $^{226}Ra$/ml. The corresponding $^{226}Ra$ distribution coefficient was 3800.

EXAMPLE III

Adsorption of Radium With Fly Ash Derived From South Dakota Coal

This experiment was conducted with fly ash recovered from collectors installed in a power plant burning  South Dakota coal. The ash was analyzed for selected onstituents, which were present in the following percentages by weight: Al, 4.9%; Ca, 17.4%; Fe, 3.8%; Si, 8.1%; $SO_4$, 1.25%; Ba, 0.05%; Sr, 0.63%. A 2.05-g ample of the ash was combined with 100 ml 3 M $HNO_3$ uranium-tailings leachate containing 226 pCi $^{226}Ra$/m. The mixture (2% solids) was agitated for 2 hours at room temperature and allowed to equilibrate. A 30 ml sample of the liquid phase was withdrawn, filtered, and analyzed as described. The $^{226}Ra$ content of the sample was 1.85 pCi/ml, and the corresponding $^{226}Ra$ distribution coefficient was 5900.

Various other particulate agents were tested to determine their suitability for the removal of radium from acidic solutions. Briefly, these tests were conducted by mixing from 2-5% of the particulate agent with the radium leachate solution. Analyses for radium were conducted as described above. Table I summarizes the results. As shown, none of these materials was found suitable.

TABLE I

| AGENT | COMMENTS |
|---|---|
| Calcium Oxalate | Too soluble in $HNO_3$, complexed by iron. |
| Thorium Oxalate | No radium carried |
| Calcium Phosphate | Very little radium carried, soluble >.25 M $HNO_3$ |
| Ferrous Phosphate | Soluble >.3 M $HNO_3$ |
| Calcium Acid Phosphate | Soluble >.25 M $HNO_3$ |
| Apatite (Calcium Fluoro Phosphate) | Does carry radium in dilute acid (0.1 M); soluble >0.5 M $HNO_3$ |
| Bone Ash | Too soluble in nitric acid |

Referring to the invention more generally, any suitable contacting means and technique used to achieve intimate mixing of the coal fly ash and the radium-containing acidic solution. Preferably, the contacting operation is effected at room temperature, especially where large volumes are involved, and is conducted for a time sufficient to establish equilibrium. The resulting radium-containing fly ash may be separated from the liquid phase by any suitable technique—as, for example, decantation or filtration. Various cenrifugation techniques are available for packaging the radium-containing ash for long-term storage. Preferably, the ash is incorporated in a refractory storage matrix (e.g, glass or concrete) which is highly resistant to environmental conditions. If desired, the ash may be stored in any other suitable manner, as in impervious drums, vaults, or the like.

The single FIGURE illustrates one way in which the invention may be incorporated in a process for removing uranium, thorium, and radium-226 from uranium-mill tailings. First, the tailings are subjected to batch, multistage, crosscurrent leaching at 33% solids concentration in 3 M $HNO_3$ in each stage. The resulting leach solution is contacted ith coal fly ash to effect adsorption of the $^{226}Ra$ on the ash. Contacting is effected at room temperature and on a stirred-batch basis. The radium-containing ash then is recovered by filtration, dried, incorporated in a glass matrix, and stored. The resulting substantially ash-free nitric acid solution is treated by conventional solvent-extraction techniques to effect separate recovery of the uranium and thorium. The resulting purified nitrc acid solution is recycled for re-use as leachant for additional tailings.

As illustrated above in terms of its application to uranium-mill tailings, the invention accomplishes the above-stated objects and provides valuable advantages. An important advantage is that coal fly ash is an inexpensive, high-surface-area waste material which is available in large quantities throughout the United States, including the regions where uranium tailings are stored. Another important advantage is that the fly ash is resistant to acidic solutions, so that radium adsorption can be effected with comparatively little consumption of the acid. A third important advantage is that radium absorption on the ash is characterized by high radium-distribution coefficients. Still another advantage is that the coal fly ash need not to be pre-treated but can be used as recovered from industrial fly ash collectors.

My experiments show that coal fly ash adsorbs radium effectively from both strong and comparatively weak nitric acid solutions. It is my opinion that all types of coal fly ash will adsorb radium to some extent from radium-containing aqueous acidic solutions in general, including solutions of most inorganic acids. Hydrofluoric acid may be an exception. It is believed that especially good results can be obtained with $HNO_3$, $HCl$, and $H_2SO_4$. One skilled in the art can readily determine the suitability of a particular coal fly ash for adsorbing radium from a given acidic solution, by means of only routine testing.

The foregoing description of a preferred form of the invention has been presented to explain the principles of the invention and enable others skilled in the art to best utilize it in a particular application. Obviously, many modifications and variations are possible in view of this disclosure. Given the teachings herein, one versed in the art will be able to determine the most suitable coal fly ash and the most suitable process conditions for a given application, without resorting to more than routine experimentation.

It is intended that the scope of the invention be defined by the appended claims.

I claim:

1. A process for recovering radium from an acidic solution containing the same, comprising:
   contacting said solution with coal fly ash for a time sufficient to effect adsorption of said radium on said ash; and
   separating the resulting radium-carrying ash from said solution.

2. The process of claim 1 further characterized by effecting said contacting at ambient temperature.

3. The process of claim 1 wherein said separating is effected by decanting.

4. The process of claim 1 wherein said separating is effected by centrifugation.

5. The process of claim 1 wherein said separating is effected by filtering.

6. The process of claim 1 wherein said solution is a nitric acid solution.

7. The process of claim 6 wherein said solution is from 1.0 to 3 M nitric acid.

8. A process for the recovery of radium which is dissolved in an acidic aqueous solution, comprising:
   contacting said solution with coal fly ash to effect adsorption of said radium on said ash;
   separating the resulting radium-carrying ash from said solution;
   incorporating the separated ash in a refractory matrix material;
   and
   storing said ash-containing matrix material.

9. The process of claim 8 wherein said acidic aqueous solution is a solution of $NHO_3$, $HCl$, or $H_2SO_4$.

10. The process of claim 8 wherein said contacting is effected at room temperature.

11. The process of claim 8 wherein said contacting is effected by mixing.

12. The process of claim 8 wherein said separating is effected by one of filtering, decanting, and centrifuging.

13. A process for the recovery of radium from an inorganic-acid solution containing radium, uranium, and thorium, comprising:
    contacting said solution with coal fly ash to effect adsorption of said radium on said ash, and
    separating the resulting mixture into a radium-carrying ash fraction and a liquid fraction containing uranium and thorium.

14. The process of claim 13 wherein said solution is an aqueous solution of $HNO_3$, $HCl$, or $H_2SO_4$.

15. The process of claim 13 wherein said contacting is effected at ambient temperature.

16. The process of claim 13 wherein the concentration of said inorganic acid in said solution exceeds 1.0 M.

* * * * *